United States Patent [19]

Green et al.

[11] 3,999,873
[45] Dec. 28, 1976

[54] LIFT TRUCK MAST MOUNTING ARRANGEMENT

[75] Inventors: Donald A. Green, Newbury; Milford D. McVeen, Highland Heights, both of Ohio

[73] Assignee: Towmotor Corporation, Mentor, Ohio

[22] Filed: June 26, 1975

[21] Appl. No.: 590,668

Related U.S. Application Data

[62] Division of Ser. No. 443,293, Feb. 19, 1974, Pat. No. 3,915,324.

[52] U.S. Cl. ............................. 403/152; 403/315; 403/163; 214/674
[51] Int. Cl.² ......................................... B66F 9/20
[58] Field of Search .......... 403/154, 157, 158, 152, 403/159, 151, 155, 150, 163, 79, 315; 16/169, 168; 74/251 R, 254; 85/5 CP, 5 N; 308/52; 214/670–674

[56] References Cited

UNITED STATES PATENTS

| | | | |
|---|---|---|---|
| 1,190,603 | 7/1916 | Squires | 16/169 |
| 1,195,936 | 8/1916 | White | 403/150 |
| 1,632,049 | 6/1927 | Webster | 403/152 |
| 2,230,457 | 2/1941 | Hollmann | 74/254 |
| 2,743,895 | 5/1956 | Tygh | 403/79 |
| 2,869,842 | 1/1959 | Schmidt | 403/315 |
| 3,455,059 | 7/1969 | Evans | 16/171 |
| 3,889,829 | 6/1975 | Dutton | 403/157 |

*Primary Examiner*—Andrew V. Kundrat
*Attorney, Agent, or Firm*—Phillips, Moore, Weissenberger, Lempio & Strabala

[57] ABSTRACT

A mounting assembly for the mast of a lift truck includes a pair of spaced apart hanger bracket members secured to the truck and including upwardly opening pivot pin receiving slots. A pair of pivot pins are rotatably supported in a pair of brackets on the mast frame and are received within the upwardly opening slots. Means are provided on the pins to prevent axial and rotational movement thereof relative to the hanger brackets. Retainer means for retaining the pins within the slots comprises a block disposed above the pin and secured to the hanger bracket by a screw accessible solely from above the pin and between the mast and truck.

7 Claims, 4 Drawing Figures

LIFT TRUCK MAST MOUNTING ARRANGEMENT

This is a division, of Ser. No. 443,293, filed Feb. 19, 1974 now U.S. Pat. No. 3,915,324, issued Oct. 28, 1975.

BACKGROUND OF THE INVENTION

This invention relates to lift trucks and pertains particularly to an assembly for pivotally supporting the mast assembly on a lift truck. Such mounting arrangement is an improvement to mounting arrangements such as disclosed in U.S. Pat. No. 3,782,571, issued Jan. 1, 1974 Murphy et al. and assigned to the assignee hereof.

While the invention of the above application solved many of the problems associated with the mounting of mast frames to lift trucks, one problem that still exists is that the carriage and the inner upright of the mast frame must be raised in order to permit the installation of the retainer pin from the front of the mast.

This means that a mechanic installing the mast must work under the carriage and forks which must be somehow propped up or supported overhead. Consequently, the present invention was developed to eliminate this obvious hazardous situation by providing a mounting arrangement which is accessible from behind the mast while the forks are on the ground.

SUMMARY AND OBJECTS OF THE INVENTION

In accordance with the present invention a mast mounting bracket assembly includes a mast pivot pin releasably retained within a slot in a hanger bracket, secured to a lift truck, by retaining means that is easily accessible from above the pin and between the mast and the truck.

The primary object of the present invention is to provide a lift truck mast mounting pivot assembly that overcomes the above problems of the prior art.

Another object of the present invention is to provide a mast mounting assembly retaining that is easily accessible from between the mast and truck.

BRIEF DESCRIPTION OF THE DRAWINGS

The aforementioned and other objects and advantages will bcome apparent from the specification when read in conjunction with the accompanying drawings wherein.

DETAILED DESCRIPTION OF A PREFERRED EMBODIMENT

Figure 1:
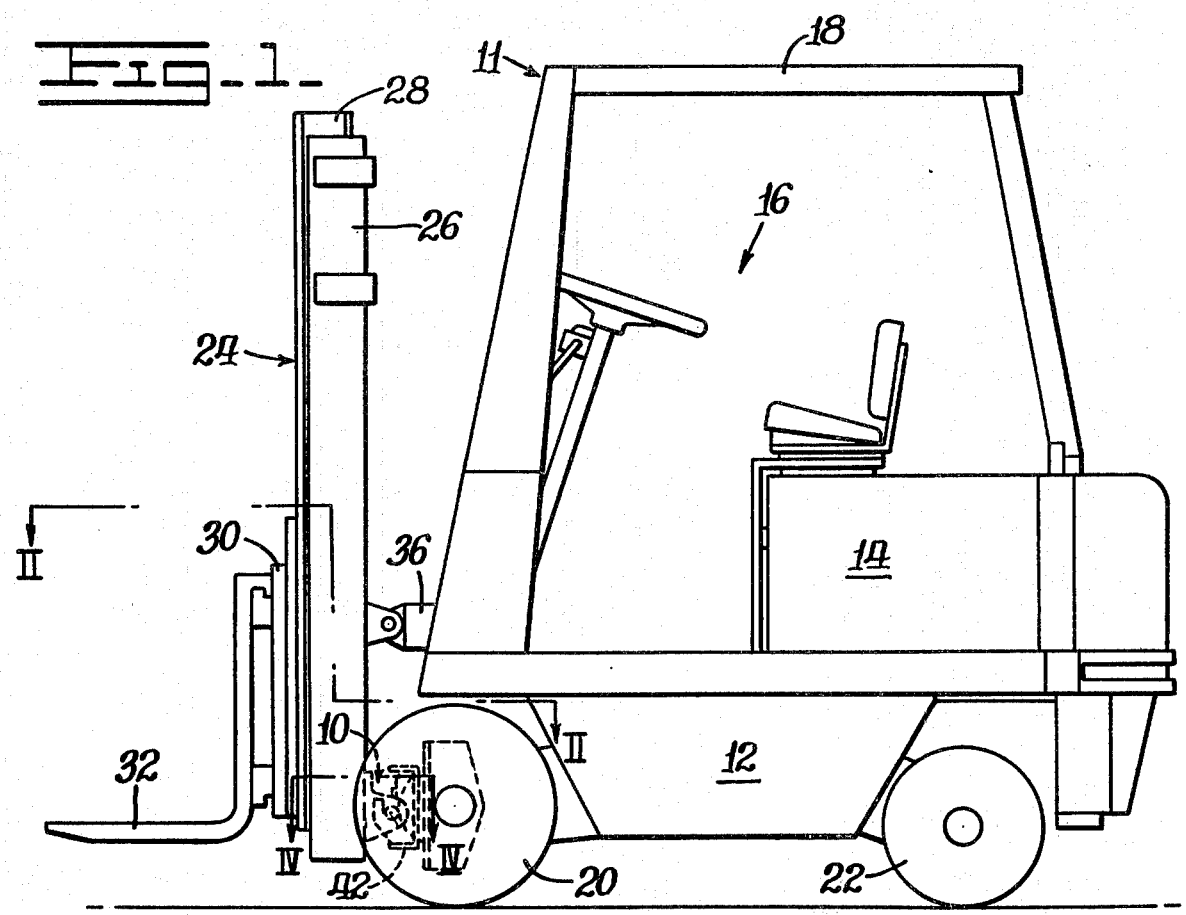
FIG. 1 is a side elevational view of a lift truck incorporating the present invention.

Referring now to the drawings, particularly to FIG. 1, there is illustrated a mast mounting assembly generally indicated at 10 in combination with a fork lift truck 11. The truck includes a chassis 12 having suitable motor or prime mover means, not shown, in an enclosure generally indicated at 14. An operator station, generally indicated at 16, is protected by suitable rollover protective structure 18. Ground engaging front drive wheels 20 and rear wheels 22 are mounted in the usual manner to support the vehicle for movement over the ground.

A lift mast assembly indicated generally at 24 including a pair of vertically-telescoping lift masts 26 and 28 movably support a carriage 30. The carriage includes a pair of lift forks 32 mounted thereon in a conventional manner. The lift mast assembly is detachably mounted on the truck by means of the mast mounting assembly 10. Pivotal movement in a fore and aft direction of the lift mast assembly about the mounting assembly 10 is accomplished by means of a pair of hydraulic jacks, one of which is shown at 36. These jacks are pivotally connected between the chassis 12 and the tiltable, lift mast assembly 24.

Figure 2:
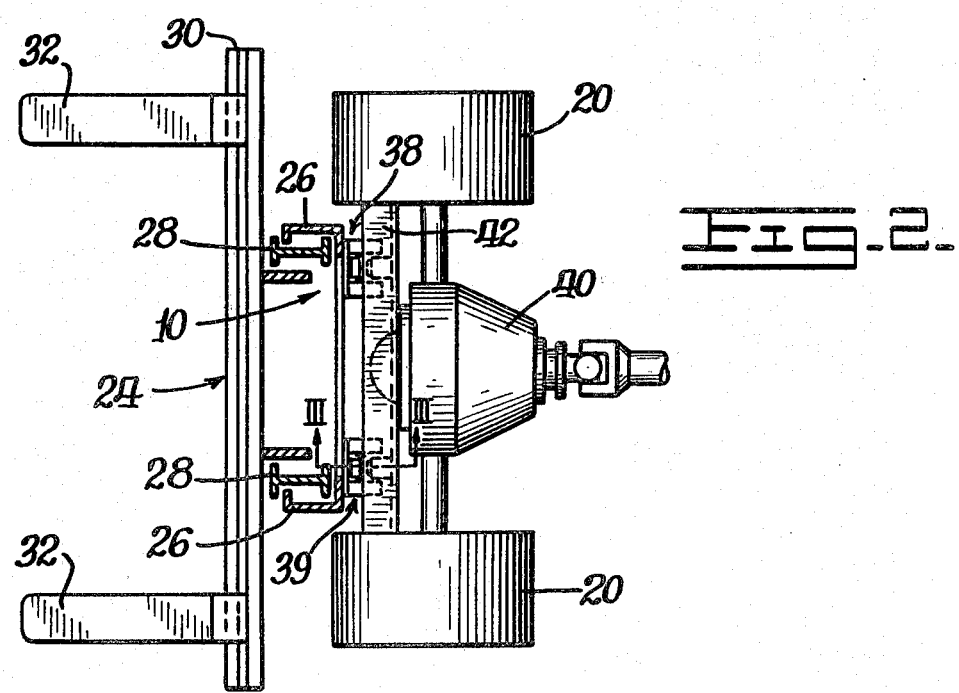
FIG. 2 is a view taken generally along lines II — II of FIG. 1.

As best seen in FIG. 2, the mast mounting arrangement 10 includes a pair of spaced apart identical pivot assemblies 38 and 39 located on the front axle assembly, and positioned on the opposite sides of a differential housing 40. Each pivot assembly unit is fastened to both the mast frame assembly 24 and a laterally extending member 42 of the front axle assembly. As both pivot assemblies are identical, only one is described in detail below.

Figure 3:
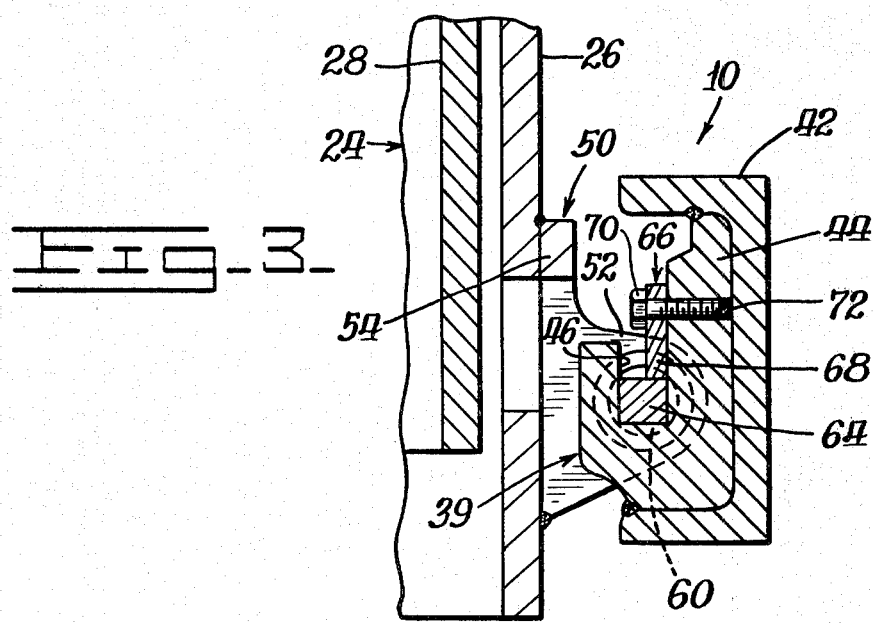
FIG. 3 is an enlarged fragmentary view in section taken generally along lines III — III of FIG. 2; and, FIG. 4 is sectional view taken generally along lines IV – IV of FIG. 1.
Figure 4:
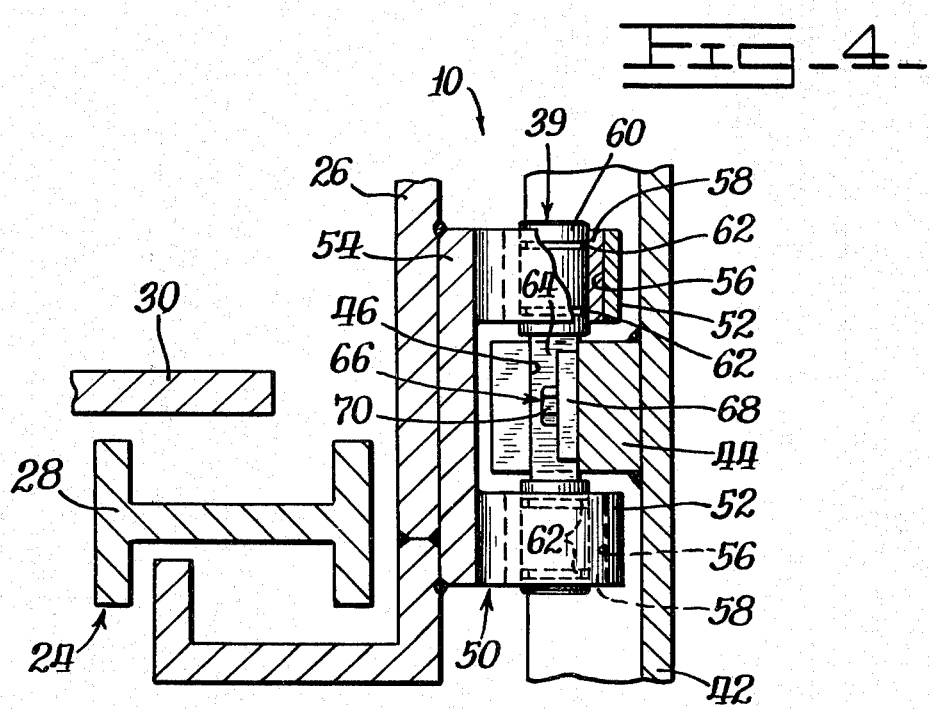

As more clearly shown in FIGS. 3 and 4, the pivot assembly 39 includes a generally hook-shaped hanger bracket 44 having an upwardly opening, rectangularly-shaped slot 46 for receiving a pivot pin or shaft, to be described.

A mast bracket 50 is secured to the mast 26 of the lift mast assembly 24. The mast bracket includes a pair of arms 52 extending from a base 54. As more clearly shown in FIG. 4, the mast bracket is provided with a pair of axially aligned bores 56 formed in the outer ends of the arms 52 for journaling a pivot pin. Fitted within the bores 56 in a conventional manner are concentric sleeve bearings 58, in which a pivot pin 60 is rotatably mounted. A pair of o-rings 62 of suitable resilient material, such as rubber, are contained within spaced annular grooves formed in the periphery of the pin 60 adjacent the opposite sides of the arms 52. These o-rings act as seals to retain bearing lubricant and to keep out deleterious abrasive material. The pin 60 also includes a square-shaped, center portion 64 which is dimensioned to be received within the rectangularly-shaped slot 46 of the hanger bracket 44 and to be maintained non-rotatable therewith.

A retaining device, shown generally at 66 includes a rectangularly-shaped block or plate 68, and secured in place by a bolt 70. The plate is positioned above and in engagement with the upper side of the center portion 64 of the pin to prevent the pin from slipping out of the slot during operation. The plate 68 may be secured to the hanger bracket 44 by any suitable means, such as a bolt 70, which is disposed in threaded engagement with a threaded bore 72 formed in the hanger bracket, as shown in FIG. 3.

The position of the square-shaped center portion 64 of the pin 50 within the rectangularly-shaped slot 46 of the hanger bracket insures that pivoting occurs between the pin and the bearings 58. Axial movement of the pin is limited by abutment of the shoulders defined at the opposite sides of the hanger bracket 44. As noted above, the retainer device 66 prevents the disengagement of the pin from the hanger bracket during operation of the lift truck. However, when it is desired to remove the mast assembly from the hanger bracket, the mounting bolt 70 is readily accessible for removal from directly above the pin 60 by suitable wrench extended between the mast 26 and the member 42 on the lift truck. This eliminates the necessity of raising the carriage 30 to gain access from the front or below the mast assembly.

While the invention is illustrated by a single embodiment, it is to be understood that the invention is to be limited only by the scope of the appended claims.

We claim:

1. A lift truck mast mounting assembly comprising:
   a hanger bracket having an upwardly opening slot formed therein;
   a mast mounting pivot pin having a central portion received in said slot and including means for preventing rotation of said pin relative to said hanger bracket; and
   retaining means comprising a removable block secured to said hanger bracket above and engaging said central portion and accessible from above said slot for retaining said pivot pin within said bracket.

2. The mounting bracket of claim 1 wherein said pivot pin central portion defines means for preventing axial movement of said pin with respect to said hanger bracket.

3. The mounting assembly of claim 1 wherein said pivot pin includes, a central portion having a substantially square cross-sectional configuration, a pair of cylindrical end portions for pivotally mounting a bracket having a pair of spaced-apart arm members.

4. A lift truck mast mounting assembly comprising:
   a hanger bracket having an upwardly opening slot formed therein;
   a mast mounting pivot pin having a central portion defining parallel faces received in said slot and engaging opposing walls of said slot for preventing rotation of said pin relative to said hanger bracket; and
   retaining means removably secured to said hanger bracket above and engaging said central portion and accessible from above said slot for retaining said pivot pin within said bracket.

5. The mounting bracket of claim 4 wherein said pivot pin central portion defines shoulder means for preventing axial movement of said pin with respect to said hanger bracket.

6. The mounting assembly of claim 5 wherein said central portion defines a substantially square cross-sectional configuration, and a pair of cylindrical end portions for pivotally mounting a bracket having a pair of spaced-apart arm members.

7. The mounting assembly of claim 5 wherein said retaining means comprises a removable block secured to said bracket.

* * * * *